United States Patent
Spiegelberg

[11] Patent Number: 5,791,750
[45] Date of Patent: Aug. 11, 1998

[54] ARRANGEMENT FOR PREVENTING A VEHICLE FROM ROLLING AWAY

[75] Inventor: Gernot Spiegelberg, Rountzenheim, Germany

[73] Assignee: Mercedes-Benz AG, Germany

[21] Appl. No.: 578,918

[22] Filed: Dec. 27, 1995

[30] Foreign Application Priority Data

Dec. 27, 1994 [DE] Germany .................. 44 46 823.7

[51] Int. Cl.[6] ............................................. B60T 8/32
[52] U.S. Cl. ........................................ 303/191; 477/194
[58] Field of Search ............................ 303/3, 15, 189, 303/191; 192/4 A, 13 A; 188/170, 353, 358; 477/194, 71, 92

[56] References Cited

U.S. PATENT DOCUMENTS

| | | | |
|---|---|---|---|
| 3,684,049 | 8/1972 | Kinsura | 180/103 |
| 4,629,043 | 12/1986 | Matsuo | 192/4 A |
| 4,717,207 | 1/1988 | Kubota | 303/3 |
| 5,531,514 | 7/1996 | Nishii | 303/116.2 |
| 5,584,539 | 12/1996 | Hashida | 303/116.2 |

FOREIGN PATENT DOCUMENTS 36 21 076  3/1992  Germany .

*Primary Examiner*—Robert J. Oberleitner
*Assistant Examiner*—C. T. Bartz
*Attorney, Agent, or Firm*—Evenson, McKeown, Edwards & Lenahan, P.L.L.C.

[57] ABSTRACT

This invention relates to an arrangement for preventing unintended rolling of a vehicle. If, in the case of a vehicle which is parked properly (with the parking brake activated), it is determined that the parking brake is released, a brake pressure is generated which ensures the stoppage of the vehicle. For this purpose, a control device actuates relay valves to establish a fluid connection between a pressure accumulator and the wheel brakes. The fluid connection is maintained until a brake pressure is applied by the wheel brake cylinders which ensures the stoppage of the vehicle.

9 Claims, 1 Drawing Sheet

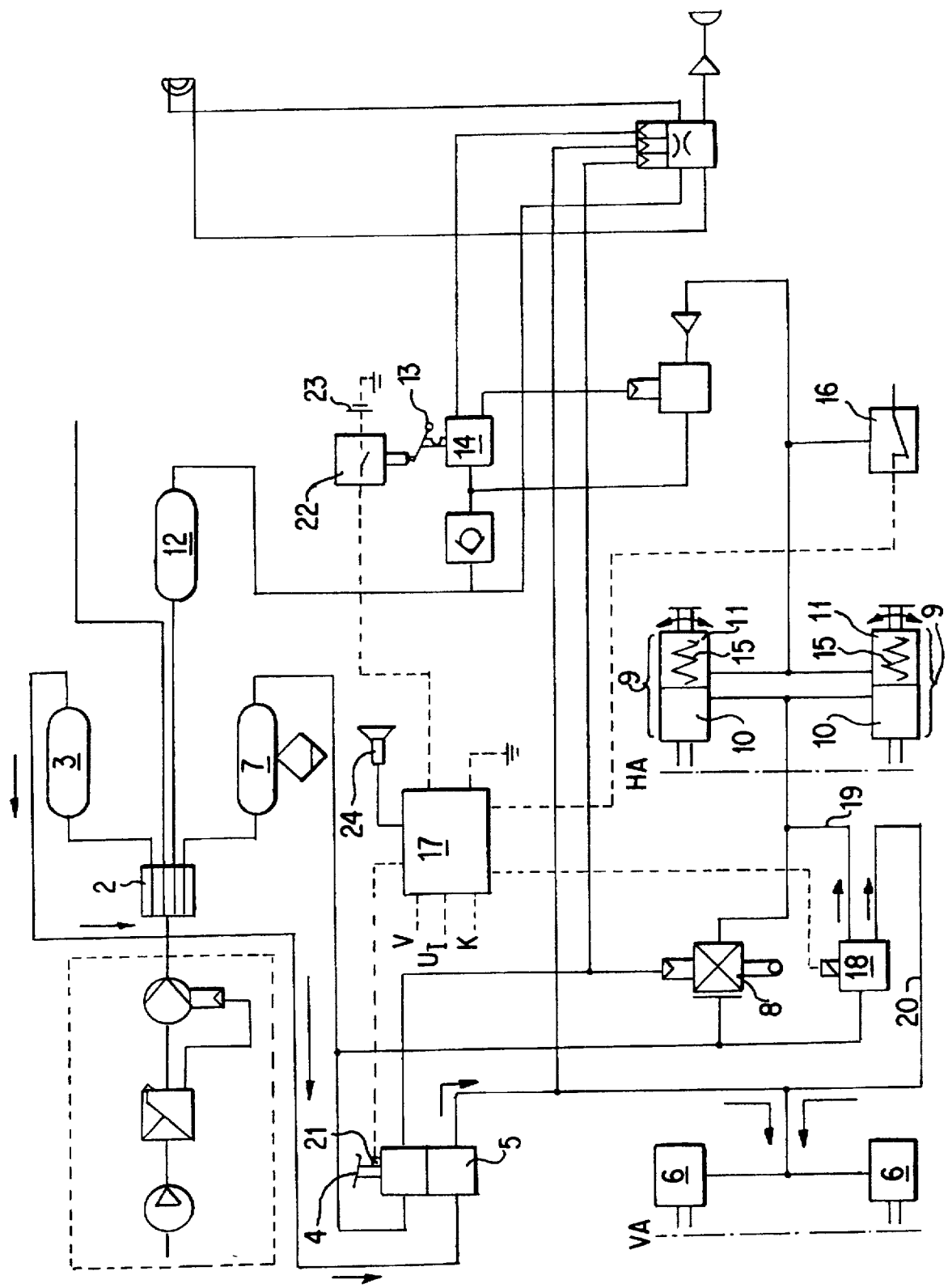

ARRANGEMENT FOR PREVENTING A VEHICLE FROM ROLLING AWAY

BACKGROUND AND SUMMARY OF THE INVENTION

This invention relates to an arrangement for preventing a stopped vehicle from accidentally rolling away.

German patent document DE 36 21 076 C2 discloses an arrangement to maintain the brake pressure originating from activation of the brake when a vehicle is stopped, until either a starting operation is detected, or until the parking brake of the vehicle is activated. In this arrangement, the corresponding control devices are connected with a current source, independently of the position of the ignition lock. In addition, when the driver's door is opened, a warning signal is generated if the parking brake is still not engaged. In this case, the holding of the braking force will not be terminated before it is ensured that the driver has activated the parking brake.

Thus, it is ensured that the driver activates the parking brake before leaving the vehicle, and that the vehicle will not start to roll. However, when vehicles are parked on a hill, a driver's carelessness or that others (for example, children) may cause the hand brake to be released again and the vehicle may roll away.

It is an object of the invention to improve the foregoing arrangement in such a manner that, when a vehicle is properly parked, unintentional rolling away of the vehicle cannot take place when the parking brake is released.

This object is achieved by the arrangement according to the invention, which includes a pressure accumulator for the generating a braking force when the vehicle engine is turned off (since in this case a pressure source which depends on the vehicle's operation is not available). As a rule, such a pressure accumulator exists in utility vehicles with pneumatic pressurized brake systems, so that such brake systems are suitable for implementing the invention without great expenditures. According to the invention, if it is determined in the case of a properly parked vehicle (that is, a vehicle with an activated parking brake) that the parking brake is released, a control device activates relay valves which generate brake pressure to ensure stopping of the vehicle. That is, a fluid connection is established between the pressure accumulator and wheel brakes, and is maintained until a brake pressure is applied by the wheel brake cylinders, which ensures the stopping of the vehicle.

According to one embodiment of the invention, it is also determined whether, when the vehicle engine is operating, a gear is engaged and the clutch is operated. If so, it is concluded that the driver has intentionally released the parking brake, and no brake pressure is generated.

In a further embodiment of the invention, it may also be determined whether the brake pedal is being operated with a force sufficient to ensure stopping of the vehicle. When the rolling function is activated, this brake pressure is further held in the wheel brakes after the brake pedal is released, or is proportionally increased correspondingly by the additionally required brake pressure expenditure of the trailer.

In yet another embodiment of the invention, the generated brake pressure is reduced again when either the parking brake is operated again or the control device recognizes a starting operation from the signals supplied to it. In devices for preventing rolling-away of a vehicle, it is customary to conclude that a starting operation exists when a closing of the clutch occurs and a gear is engaged while the engine is running.

Other objects, advantages and novel features of the present invention will become apparent from the following detailed description of the invention when considered in conjunction with the accompanying drawings.

DESCRIPTION OF THE DRAWINGS

The single FIGURE of the drawing is a schematic representation of a brake system of a truck with an arrangement according to the invention.

DETAILED DESCRIPTION OF THE DRAWING

The FIGURE illustrates a dual-circuit low-pressure brake system of a utility vehicle, with a pressure generating device 1 which generates the operating pressure for the brake system during operation of the vehicle. By way of a four-circuit guard valve 2, operating pressure is distributed to the two brake circuits, to the brake circuit of the parking brake, and to the auxiliary devices.

When the service brake pedal 4 is operated, the brake circuit for the front axle VA with brake cylinders 6 is supplied with compressed air from the pressure accumulator 3 by the service brake valve 5 in a controlled manner.

So-called combination brake cylinders 9 are arranged on the rear axle HA and perform the service brake function as well as the parking brake function. During operation as a service brake, a braking force is generated when brake pressure is applied to a brake cylinder 10. This takes place when, as a result of the operation of the brake pedal 4, the service brake valve 5 is actuated, conveying a desired pressure value to the brake system. By way of the brake power control device 8, or, in the case of an electropneumatic brake pressure control, by way of the pressure control circuits, brake fluid from the pressure accumulator 7 arrives in the brake cylinder 10 of the combination brake cylinder 9 and of the front axle cylinder 6.

The parking brake has a spring accumulator 11 which is fluidically connected with the pressure accumulator 12 when the parking brake lever 13 is not actuated. By means of the pressure existing in the spring accumulator 11, the spring 15 of the spring accumulator 11 is tensioned and the parking brake is released. As soon as the pressure in the pressure accumulator 12 drops or the parking brake lever 13 is activated, the spring accumulator 11 is bled, so that the spring 15 relaxes and activates the brake (not shown) which, in this embodiment, is applied only to the rear axle. (The combination brake cylinder 9 activates the same brake on the wheels of the rear axle HA in its function as the service brake as well as in its function as the parking brake.)

The testing device 16 determines whether the pressure in the spring accumulator 11 is sufficiently high to release the brake, and emits a corresponding signal to the control device 17. The control device 17 is also supplied with a signal v representing the vehicle speed, a signal k representing the clutch and a signal representing the operation of the engine $U_f$.

When the engine is turned off, the signal $U_f$ is set from "1" to "0". The control device then determines whether the parking brake is engaged. For this purpose, the testing device 16 emits a signal "1" as soon as the pressure has dropped in the spring accumulator 11 and the brake on the rear axle HA is closed by the effect of the spring 15. If this is not so (that is, the parking brake is not engaged), the control device 17 opens the relay valve 18 and, as a result, brake pressure is applied in the brake cylinder 10 of the combination brake cylinder 9. As long as brake pressure is generated in this manner, a warning signal is provided to the driver over the loudspeaker. This results in a closing of the brake on the axles of the towing vehicle.

In certain operating conditions, also when the engine is running, the relay valve 18 can be operated by the control device 17 in a known manner, as described in the case of so-called blocking devices for preventing a rolling-away, for example, in German patent document DE 36 21 076 C2. In the embodiment illustrated in the FIGURE herein, the relay valve 18 is fluidically connected not only with the brake cylinders 9 of the rear axle HA (by the pressure line 19), but also with the brake cylinders 6 of the front axle VA (by the pressure line 20). As a result, when the valve 18 is actuated, braking pressure is applied not only to the rear axle HA but also to the front axle VA.

The signal of a sensor 21, which detects the operation of the brake pedal 4, is also transmitted to the control device 17. Independently of the operating condition of the vehicle, when the parking brake is released, in response to the change of the signal of the testing device 16 from value "1" to value "0" it is determined whether a reduction of the braking force is permissible. Such reduction is recognized as permissible only if either:

it is determined by the sensor 21 that the brake pedal 4 is activated to such an extent that a minimal braking force is applied; or it is concluded that a starting operation is taking place (for example, when a gear is engaged, with the engine running and the clutch opened).

As long as the predetermined minimal braking force is applied by actuation of the brake pedal, additional braking intervention is not required. Brake pressure in the pressure accumulator 7 is conserved if, at least as long as this braking force is applied, no braking pressure is generated by the control device 17. In addition, during the starting of a vehicle it is conventional to operate the service brake 4 before the parking brake is released. In this case, the minimal braking force may be indicated as a minimum of the pedal travel to be carried out. The minimal braking force must be sufficient to hold the maximum vehicle weight, including the load, securely in the stopped condition. As a precautionary measure, the minimal braking force may also correspond to the maximal braking force, or the corresponding minimal pedal travel may correspond to the pedal travel required for generating a maximal brake pressure. As an alternative for sensing the operation of the brake pedal 4, the brake pressure generated in the wheel brake cylinders 10 may be sensed.

In this case, it was found to be an advantage that a releasing of the parking brake 11, provided that sufficient pressure still exists in the pressure accumulator 7 to bridge the spring force of the spring 15 of the spring accumulator 11 and to completely release the parking brake. If this is not so, a residual braking effect of the parking brake will remain. This situation is determined by the testing device 16 and is indicated to the driver by a warning device.

The electric supply to the control device 17 must be ensured, even when the ignition of the vehicle is switched off. However, it is not required as long as the parking brake is activated, because braking force is generated by the spring accumulator 11. As a result, the switch 22 interrupts current supplied by the current source 23, which is independent of the position of the ignition switch, as soon as the parking brake lever 13 is brought into a position which corresponds to an activated parking brake. As soon as the parking brake lever 13 is brought into a position which corresponds to a release of the parking brake, the current supply is connected again.

A corresponding arrangement may also be used in passenger cars. For this purpose, the vehicle must have a pressure accumulator for generating braking force, which is independent of the vehicle engine. If a wheel slip control exists, with a reservoir for braking medium, this wheel slip control can be used. Likewise, the arrangement according to the invention may be used in vehicles with an electropneumatic brake system. Control of the brake pressure will then be performed by the pertaining brake pressure control circuits.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Arrangement for preventing unintended rolling of a vehicle having a braking system with a brake pedal, wheel brake cylinders and a parking brake, said arrangement comprising:

a pressure accumulator;

a control device, energized independently of a switch position of a vehicle ignition switch, for controlling a build-up and reduction of brake pressure in said wheel brake cylinders;

means for detecting actuation of said parking brake, and for transmitting a signal indicative thereof to said control device;

at least one relay valve for interruptibly connecting said wheel brake cylinders with said pressure accumulator;

wherein said control device includes means responsive to absence of said signal indicative of actuation of said parking brake, for actuating said at least one relay valve to connect said wheel brake cylinders with the pressure accumulator, whereby brake pressure is built-up in the wheel brake cylinders from the pressure in the accumulator, ensuring stoppage of the vehicle.

2. Arrangement according to claim 1 further comprising:

means for detecting when an engine of said vehicle is running;

means for detecting when a gear of said vehicle is engaged; and means for detecting when a clutch of said vehicle is opened;

wherein said control device includes means for causing no brake pressure to be generated when the parking brake is released, when it is determined that the vehicle engine is running, a gear is engaged and the clutch is opened.

3. Arrangement according to claim 1 wherein by activating valves bleeding the wheel brake cylinders, the control device reduces built-up brake pressure if either the parking brake is applied or, while the engine is running, the clutch is operated in a closing direction.

4. Arrangement according to claim 1 wherein:

the parking brake is biased in a closing direction and can be released by admitting brake fluid to a spring accumulator; and in the case of a build-up of brake pressure in wheel brakes caused by the control device, a fluid connection is also established between the pressure accumulator and a second spring accumulator.

5. Arrangement according to claim 1 further comprising means for activating a warning signal in the case of a build-up of brake pressure in wheel brakes caused by the control device.

6. Arrangement according to claim 1 further comprising means for detecting an actuation of the brake pedal which actuation generates brake pressure sufficient to ensure at least the stoppage of the vehicle, wherein the control device comprises means for preventing actuation of said at least one relay valve when said sufficient brake pressure is detected.

7. Arrangement according to claim 1 wherein the built-up brake pressure is reduced when either the parking brake is activated again or a starting operation is recognized in the control device.

8. Arrangement according to claim 1 wherein an electric supply of the control device is determined by a position of a parking brake lever of said parking brake, the electric supply being interrupted in the case of a position of the parking brake lever which corresponds to an activated parking brake, and the current supply of the control device being closed when the position of the parking brake lever corresponds to an inoperative parking brake.

9. Arrangement for preventing unintended rolling of a vehicle having a braking system with a brake pedal, wheel brake cylinders and a parking brake, said arrangement comprising:

a pressure accumulator;

a control device, energized independently of a switch position of a vehicle ignition switch, for controlling a build-up and reduction of brake pressure in said wheel brake cylinders;

means for detecting actuation of said parking brake, and for transmitting a signal indicative thereof to said control device;

at least one relay valve for interruptibly connecting said wheel brake cylinders with said pressure accumulator;

wherein said control device includes means responsive to absence of said signal indicative of actuation of said parking brake, for actuating said at least one relay valve to communicate pressure from the pressure accumulator to the wheel brake cylinders, whereby brake pressure is built-up in the wheel brake cylinders from the pressure in the accumulator, ensuring stopping of the vehicle.

* * * * *